(12) United States Patent
Hussain et al.

(10) Patent No.: US 9,501,245 B2
(45) Date of Patent: Nov. 22, 2016

(54) SYSTEMS AND METHODS FOR NVME CONTROLLER VIRTUALIZATION TO SUPPORT MULTIPLE VIRTUAL MACHINES RUNNING ON A HOST

(71) Applicant: CAVIUM, INC., San Jose, CA (US)

(72) Inventors: Muhammad Raghib Hussain, Saratoga, CA (US); Vishal Murgai, Cupertino, CA (US); Manojkumar Panicker, Sunnyvale, CA (US); Faisal Masood, San Jose, CA (US); Brian Folsom, Northborough, MA (US); Richard Eugene Kessler, Northborough, MA (US)

(73) Assignee: CAVIUM, INC., San Jose, CA (US)

( * ) Notice: Subject to any disclaimer, the term of this patent is extended or adjusted under 35 U.S.C. 154(b) by 278 days.

(21) Appl. No.: 14/279,712

(22) Filed: May 16, 2014

(65) Prior Publication Data

US 2015/0317088 A1 Nov. 5, 2015

Related U.S. Application Data

(60) Provisional application No. 61/987,597, filed on May 2, 2014.

(51) Int. Cl.
*G06F 12/00* (2006.01)
*G06F 3/06* (2006.01)
*G06F 9/50* (2006.01)

(52) U.S. Cl.
CPC ............... *G06F 3/067* (2013.01); *G06F 3/061* (2013.01); *G06F 3/0613* (2013.01); *G06F 3/0643* (2013.01); *G06F 3/0655* (2013.01); *G06F 3/0664* (2013.01); *G06F 3/0665* (2013.01); *G06F 3/0688* (2013.01); *G06F 9/50* (2013.01)

(58) Field of Classification Search
CPC ..... G06F 3/067; G06F 3/0613; G06F 3/0688; G06F 3/0655
See application file for complete search history.

(56) References Cited

U.S. PATENT DOCUMENTS

| 8,214,539 B1 * | 7/2012 | Kulanko | G06F 3/038 702/125 |
| 2005/0060590 A1 * | 3/2005 | Bradley | G06F 9/5077 713/320 |
| 2008/0235293 A1 * | 9/2008 | Levering | G06F 11/1435 |
| 2014/0281040 A1 * | 9/2014 | Liu | G06F 9/50 710/3 |
| 2014/0331001 A1 * | 11/2014 | Liu | G06F 3/0659 711/103 |

* cited by examiner

*Primary Examiner* — Gurtej Bansal
(74) *Attorney, Agent, or Firm* — Duane Morris LLP; David T. Xue

(57) ABSTRACT

A new approach is proposed that contemplates systems and methods to virtualize a physical NVMe controller associated with a computing device or host so that every virtual machine running on the host can have its own dedicated virtual NVMe controller. First, a plurality of virtual NVMe controllers are created on a single physical NVMe controller, which is associated with one or more storage devices. Once created, the plurality of virtual NVMe controllers are provided to VMs running on the host in place of the single physical NVMe controller attached to the host, and each of the virtual NVMe controllers organizes the storage units to be accessed by its corresponding VM as a logical volume. As a result, each of the VMs running on the host has its own namespace(s) and can access its storage devices directly through its own virtual NVMe controller.

29 Claims, 3 Drawing Sheets

SYSTEMS AND METHODS FOR NVME CONTROLLER VIRTUALIZATION TO SUPPORT MULTIPLE VIRTUAL MACHINES RUNNING ON A HOST

CROSS-REFERENCE TO RELATED APPLICATIONS

This application claims the benefit of U.S. Provisional Patent Application No. 61/987,956, filed May 2, 2014 and entitled "Systems and methods for accessing extensible storage devices over a network as local storage via NVMe controller," which is incorporated herein in its entirety by reference.

BACKGROUND

Non-volatile memory express, also known as NVMe or NVM Express, is a specification that allows a solid-state drive (SSD) to make effective use of a high-speed Peripheral Component Interconnect Express (PCIe) bus attached to a computing device or host. Here the PCIe bus is a high-speed serial computer expansion bus designed to support hardware I/O virtualization and to enable maximum system bus throughput, low I/O pin count and small physical footprint for bus devices. NVMe typically operates on a non-volatile memory controller of the host, which manages the data stored on the non-volatile memory (e.g., SSD) and communicates with the host. Such an NVMe controller provides a command set and feature set for PCIe-based SSD access with the goals of increased and efficient performance and interoperability on a broad range of enterprise and client systems. The main benefits of using an NVMe controller to access PCIe-based SSDs are reduced latency, increased Input/Output (I/O) operations per second (IOPS) and lower power consumption, in comparison to Serial Attached SCSI (SAS)-based or Serial ATA (SATA)-based SSDs through the streamlining of the I/O stack.

Service providers have been increasingly providing their web services (e.g., web sites) at third party data centers in the cloud by running a plurality of virtual machines (VMs) on a host/server at the data center. Here, a VM is a software implementation of a physical machine (i.e. a computer) that executes programs to emulate an existing computing environment such as an operating system (OS). The VM runs on top of a hypervisor, which creates and runs one or more VMs on the host. The hypervisor presents each VM with a virtual operating platform and manages the execution of each VM on the host. By enabling multiple VMs having different operating systems to share the same host machine, the hypervisor leads to more efficient use of computing resources, both in terms of energy consumption and cost effectiveness, especially in a cloud computing environment.

Currently, the host of the VMs only sees a single instance of the physically connected NVMe controller and only the hypervisor running on the host can have access to the physical NVMe controller. Consequently, all of the VMs running on the host have to share the same NVMe controller and have to go through the hypervisor to access the storage units (namespaces) associated with the NVMe controller. Since the VMs running on the host at the data center may belong to different web service providers, it would be desirable for each of the VMs to have its own dedicated NVMe controller and namespace for its own storage units instead of sharing with other VMs.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
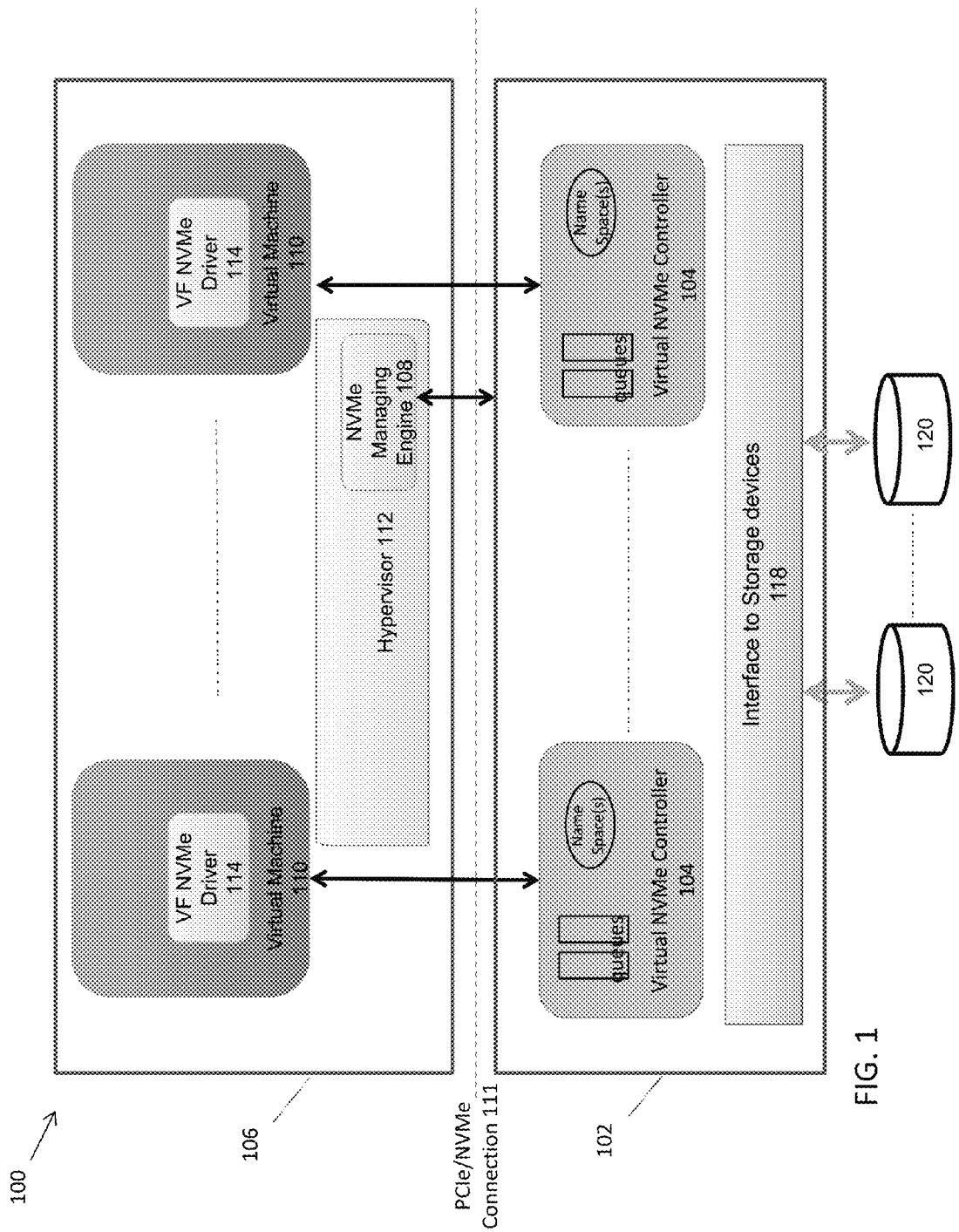
FIG. 1 depicts an example of a diagram of system 100 to support NVMe controller virtualization in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to virtualize a physical NVMe controller associated with a computing device or host so that every virtual machine running on the host can have its own dedicated virtual NVMe controller. First, a plurality of virtual NVMe controllers are created on a single physical NVMe controller, which is associated with one or more storage devices. Once created, the plurality of virtual NVMe controllers are provided to VMs running on the host in place of the single physical NVMe controller attached to the host, and each of the virtual NVMe controllers organizes the storage units to be accessed by its corresponding VM as a logical volume. As a result, each of the VMs running on the host has its own namespace(s) and can access its storage devices directly through its own virtual NVMe controller.

By virtualizing the single physical NVMe controller into a plurality of virtual NVMe controllers, the proposed approach enables VMs from different web service providers hosting at a third-party data center to each have dedicated access to its own storage namespace, which improves latency, performance, data security and integrity for the VMs. In addition, since the virtual NVMe controllers enable the VMs to access the namespace of their storage devices directly without going through the hypervisor on the host, they effectively offload the data and control I/O operations from the hypervisor, thus eliminating a potential bottleneck for the host and increasing I/O throughput for the VMs to access their storage devices.

FIG. 1 depicts an example of a diagram of system 100 to support NVMe controller virtualization. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes a plurality of virtual NVMe controllers 104 running on a physical NVMe controller 102, and an NVMe managing engine 108 running on a host 106. Here, the host 106 can be a computing device, a communication device, a storage device, or any electronic device capable of running a software component. For non-limiting examples, a computing device can be, but is not limited to, a laptop PC, a desktop PC, a mobile device, or a server machine such as an x86/ARM server. A communication device can be, but is not limited to, a mobile phone.

In some embodiments, the host 106 also hosts a plurality of VMs 110, each configured to provide a web-based service to clients over a network. Here, the VMs 110 runs on top of a hypervisor 112 on the computing unit/appliance/host 106, which comprises one or more of a CPU or microprocessor, a memory (also referred to as primary memory) such as RAM, and a storage unit such as a non-volatile memory (also referred to as secondary memory) with software instructions stored for practicing one or more processes. When the software instructions are executed, at least a subset of the software instructions is loaded into memory, and the computing unit becomes a special purpose computing unit for practicing the methods. When implemented on a general-purpose computing unit, the computer program code segments configure the computing unit to create specific logic circuits. The processes may alternatively be at least partially embodied in a digital signal processor formed of application specific integrated circuits (ASIC) for performing the processes. In some embodiments, the NVMe managing engine 108 may run as a component of the hypervisor 112 on the host 106 as discussed in details below.

In the example of FIG. 1, the physical NVMe controller 102 is a hardware/firmware non-volatile memory access module having software, firmware, hardware, and/or other components that are used to effectuate a purpose. The physical NVMe controller 102 is coupled to the host 106 via a PCIe/NVMe link/connection 111 and both the NVMe managing engine 108 and the VMs 110 running on the host 106 are configured to access the physical NVMe controller 102 and the virtual NVMe controllers 104 via the PCIe/NVMe link/connection 111. For a non-limiting example, the PCIe/NVMe link/connection 111 is a PCIe Gen3 x8 bus.

In some embodiments, the physical NVMe controller 102 further includes an interface 118 to access and communicate with a plurality of non-volatile disk storage units 120 such as SSDs. In some embodiments, the physical NVMe controller 102 provides both Physical Functions (PFs) and Virtual Functions (VFs) to support the virtual NVMe controllers 104 running on it. As referred to herein, a PF function is a PCIe function used to configure and manage the single root I/O virtualization (SR-IOV) functionality of the controller such as enabling virtualization and exposing PCIe VFs, wherein a VF function is a lightweight PCIe function that supports SR-IOV and represents a virtualized instance of the controller for a virtual NVMe controller 104. Each VF shares one or more physical resources on the physical NVMe controller 102, wherein such resources include but are not limited to on-controller memory, hardware accelerator and storage interface 118 of the physical NVMe controller 102.

Figure 2:
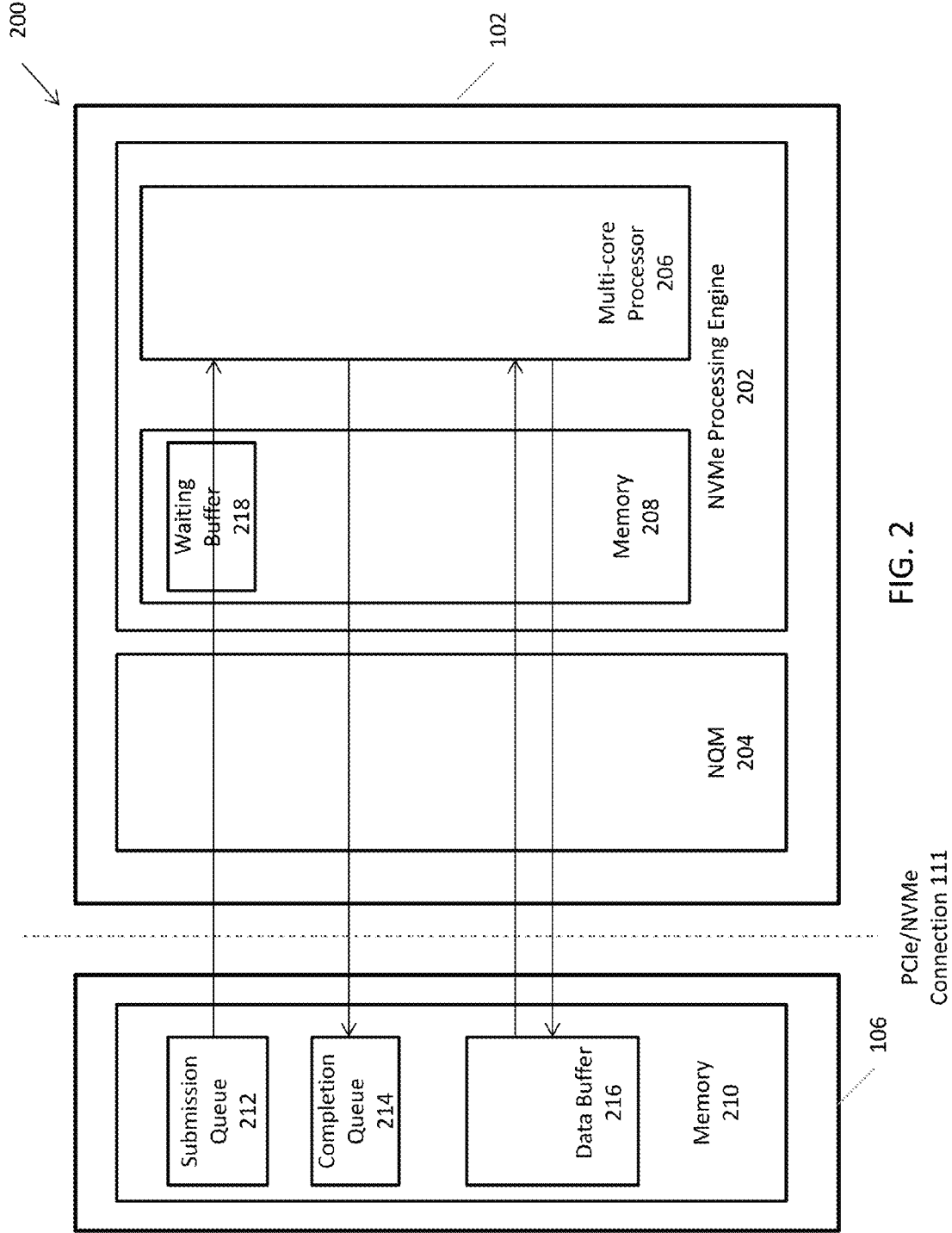
FIG. 2 depicts an example of hardware implementation of the physical NVMe controller 102 depicted in FIG. 1 in accordance with some embodiments.

FIG. 2 depicts an example of hardware implementation 200 of the physical NVMe controller 102 depicted in FIG. 1. As shown in the example of FIG. 2, the hardware implementation includes at least an NVMe processing engine 202, and an NVMe Queue Manager (NQM) 204 implemented to support the NVMe processing engine 202. Here, the NVMe processing engine 202 includes one or more CPUs/processors 206 (e.g., a multi-core ARM/MIPS processor), and a primary memory 208 such as DRAM. The NVMe processing engine 202 is configured to execute all NVMe administration and commands and to provide results upon completion of the commands. The hardware-implemented NQM 204 provides a front-end interface to the virtual NVMe controllers 104 that execute on the NVMe processing engine 202. In some embodiments, the NQM 204 manages at least a submission queue 212 that includes a plurality of administration and control commands to be processed by the NVMe processing engine 202 and a completion queue 214 that includes status of a plurality of administration and control commands that have been processed by the NVMe processing engine 202. In some embodiments, the NQM 204 further manages one or more data buffers 216 that include data read from or to be written to a storage device via one of the virtual NVMe controllers 104. In some embodiments, one or more of the submission queue 212, completion queue 214, and data buffers 216 are maintained within memory 210 of the host 106.

When one of the VMs 110 running on the host 106 performs a read or write operation, it places a corresponding command/instruction in a submission queue 212 on the host 106. During its operation, the NQM 204 is configured to fetch the administration and/or control commands from the submission queue 212 on the host 106 based on a "doorbell" of read or write operation, wherein the doorbell is generated by and received from the host 106. The NQM 204 also fetches the data to be written by the write operation from one of the data buffers 216 on the host 106. The NQM 204 then places the fetched commands in a waiting buffer 218 in the memory 208 of the NVMe processing engine 202 waiting for the multi-core processor 206 to process. In some embodiments, the commands received in the waiting buffer 218 are processed by the corresponding virtual NVMe controller via the multi-core processor 206 in the order they are received. Once the commands are processed, the NQM 204 puts the status of the command back in the completion queue 214 and notifies the corresponding VM 110 accordingly. The NQM 204 also puts the data read by the read operation to the data buffer 216 and makes it available to the VM 110.

In the example of FIG. 1, the plurality of virtual NVMe controllers 104 running on the single physical NVMe controller 102 are created and managed by the NVMe management engine 108. Here, each virtual NVMe controller 104 is a hardware accelerated software engine emulating the functionalities of an NVMe controller to be accessed by one of the VMs 110 running on the host 106, wherein all functions of the virtual NVMe controllers 104 can be managed by the NVMe management engine 108 as discussed in details below.

In some embodiments, the virtual NVMe controllers 104 have a one-to-one correspondence with the VMs 110, wherein each virtual NVMe controller 104 interacts with and allows access from only one of the VMs 110. Each virtual NVMe controller 104 is assigned to and dedicated to support one and only one of the VMs 110 to access its storage devices, wherein any single virtual NVMe controller 104 is not shared across multiple VMs 110. In some embodiments, a unique static secret (e.g., 12-byte long) is configured and assigned to each VM 110 during initialization of the system 100. Every subsequent request to a virtual NVMe controller 104 from a particular VM 110 is then checked and authenticated against the static secret assigned to the particular VM 110 in real time during the interacting process between the virtual NVMe controller 104 and the VM 110.

In some embodiments, each of the virtual NVMe controllers 104 establishes and provides its corresponding VM 110 with a logical or virtual volume/disk, which is a collection of storage units/devices with which the VM 110 performs I/O operations to. Here, the volume is classified as virtual since it maps to one or more physical storage devices locally attached to the NVMe controller 102. In some embodiments, the virtual volume includes a meta-data mapping table between the virtual volume and the storage devices 120, wherein the mapping table translates an incoming (virtual) volume identifier and a logical block addressing (LBA) on the virtual volume to one or more corresponding physical disk identifiers and LBAs on the storage devices 120. In some embodiments, the virtual disk may include logical blocks across multiple physical disks in the storage devices 120.

In some embodiments, each of the virtual NVMe controllers 104 provides/exports the storage units associated with its corresponding VM 110 as one or more NVMe namespaces organized as a plurality of directories and files to enable the VM 110 to access the virtual volume via a filename and/or a path in the namespaces. In some embodiments, multiple VMs 110 are enabled to access the same logical volume or virtual volume and each logical/virtual volume can be shared among multiple VMs through their respective virtual NVMe controllers 104.

In some embodiments, each virtual NVMe controller 104 is configured to support identity-based authentication and access from its corresponding VM 110 for its operations, wherein each identity permits a different set of API calls for different types of commands used to create, initialize and manage the virtual NVMe controller 104, and/or provide access to the logic volume for the VM 110. In some embodiments, the types of commands made available by the virtual NVMe controller 104 vary based on the type of user requesting access through the VM 110 and some API calls do not require any user login. For a non-limiting example, the NVMe managing engine 108 may utilize different types of commands to initialize and manage the virtual NVMe controllers 104 running on the physical NVMe controller 102.

In some embodiments, each of the virtual NVMe controllers 104 has one or more pairs of submission queue 212 and completion queue 214 associated with it, wherein each queue can accommodate a plurality of entries of commands from one of the VMs 110. As discussed above, the commands in the submission queue 212 are first fetched by the NQM 204 from the memory 210 of the host 106 to the waiting buffer 218 of the NVMe processing engine 202 as discussed above. During its operation, each of the virtual NVMe controllers 104 retrieves the commands of its corresponding VM 110 from the waiting buffer 218 and processes the commands on the data to be written or read accordingly to the logic volume via the NVMe processing engine 202, by invoking supporting VF functions provided by the physical NVMe controller 102. As a result, data is transmitted to or received from the storage units in the logical volume of the VM 110 via the interface to disk storage 118. Once the commands have been processed, the virtual NVMe controller 104 saves the status of the executed commands in the waiting buffer 218 of the processing engine 202, which are then placed into the completion queue 214 by the NQM 204. The data being processed by the commands of the VMs is also transferred between the data buffer 216 of the memory 210 of the host 106 and the memory 208 of the NVMe processing engine 202.

In some embodiments, each of the VMs 110 running on the host 106 has an NVMe driver 114 configured to interact with the physical NVMe controller 102 and the virtual NVMe controllers 104 via the PCIe/NVMe link/connection 111. In some embodiments, each of the NVMe driver 114 is a virtual function (VF) driver configured to interact with the PCIe/NVMe link/connection 111 of the host 106 and to set up a communication path between its corresponding VM 110 and a virtual NVMe controller 104 and to receive and transmit data associated with the corresponding VM 110. In some embodiments, the VF NVMe driver 114 of the VM 106 and the corresponding virtual NVMe controller 104 communicate with each other through a SR-IOV PCIe connection as discussed above.

In some embodiments, the VMs 110 controlled and scheduled by the hypervisor 112 of the host 106 run independently and are isolated from each other so that one VM 110 cannot access the logic volume and/or communication of any other VMs 110 running on the same host. When transmitting commands and/or data to and/or from a VM 110, the corresponding VF NVMe driver 114 directly puts and/or retrieves the commands and/or data from its queues and/or the data buffer, which is sent out or received from the PCIe/NVMe link/connection 111 without the data being accessed by the host 106 or any other VMs 110 running on the same host 106.

In the example of FIG. 1, the NVMe managing engine 108 is configured to interact with the NVMe controller 102 and to serve in an administrator role to initialize and manage the plurality of virtual NVMe controllers 104. In some embodiments, the NVMe managing engine 108 is a software component embedded in the hypervisor 112 running on the host 106. In some embodiments, the NVMe managing engine 108 is a physical function (PF) NVMe driver, which is a PCIe function implementation that supports SR-IOV interface and is used to configure and manage the SR-IOV functionality of the NVMe controller 102 such as enabling virtualization and exposing PCIe VFs to the virtual NVMe controllers 104.

During its operation, the NVMe managing engine 108 is configured to determine the number of the virtual NVMe controllers 104 needed to support the VMs 110, load drivers to the physical NVMe controller 102 used to communicate with the VMs 110, create, launch and monitor the virtual NVMe controllers 104 dedicated to serve the VMs 110, and handle critical/management updates for these various components. During its operation, the NVMe managing engine 108 issues administration commands, which are placed in its submission queue 212 in the memory 210 of host 106, fetched by the NQM 204, and processed by the processing engine 202 of the physical NVMe controller 102. The results of the execution of the commands are placed in the complete queue 214 by the NQM 204 for the NVMe managing engine 108 to process.

In some embodiments, the NVMe managing engine 108 is configured to setup and initialize the virtual NVMe controllers 104 for operating with the VF NVMe drivers 114 of the VMs 110. The NVMe managing engine 108 performs an initial handshake and establishes a request/response communication channel with the physical NVMe controller 102. The NVMe managing engine 108 identifies the number of active virtual NVMe controllers 104 needed and then creates the plurality of virtual NVMe controllers 104 each dedicated to one of the VMs 110, initializes and manages the virtual NVMe controllers 104 on the physical NVMe controller 102. In some embodiments, the NVMe managing engine 108 may subsequently add and/or remove virtual NVMe controllers 104 based on the number of VMs 110 running on the host 106 and/or the physical limitations of the physical NVMe controller 102 to support the virtual NVMe controllers 104.

In some embodiments, when a specific VM 110 is migrated from the current host 106 to another host, the NVMe managing engine 108 is configured to freeze the virtual NVMe controller 104 assigned to the VM 110 in time and move the virtual NVMe controller 104 to a different physical NVMe controller 102 as part of the migration process for the VM 110. In some embodiments, the NVMe managing engine 108 is configured to take a snapshot of the virtual NVMe controller 104 on the current physical NVMe controller 102 it is running on and copy the snapshot to the new physical NVMe controller 102 it will run on. Following the migration, the NVMe driver 114 of the VM 110 will be in communication with the instance of the virtual NVMe controller 104 running on the new physical NVMe controller 102 and the VM 110 may continue to access the storage units in its namespaces without interruption.

Figure 3:
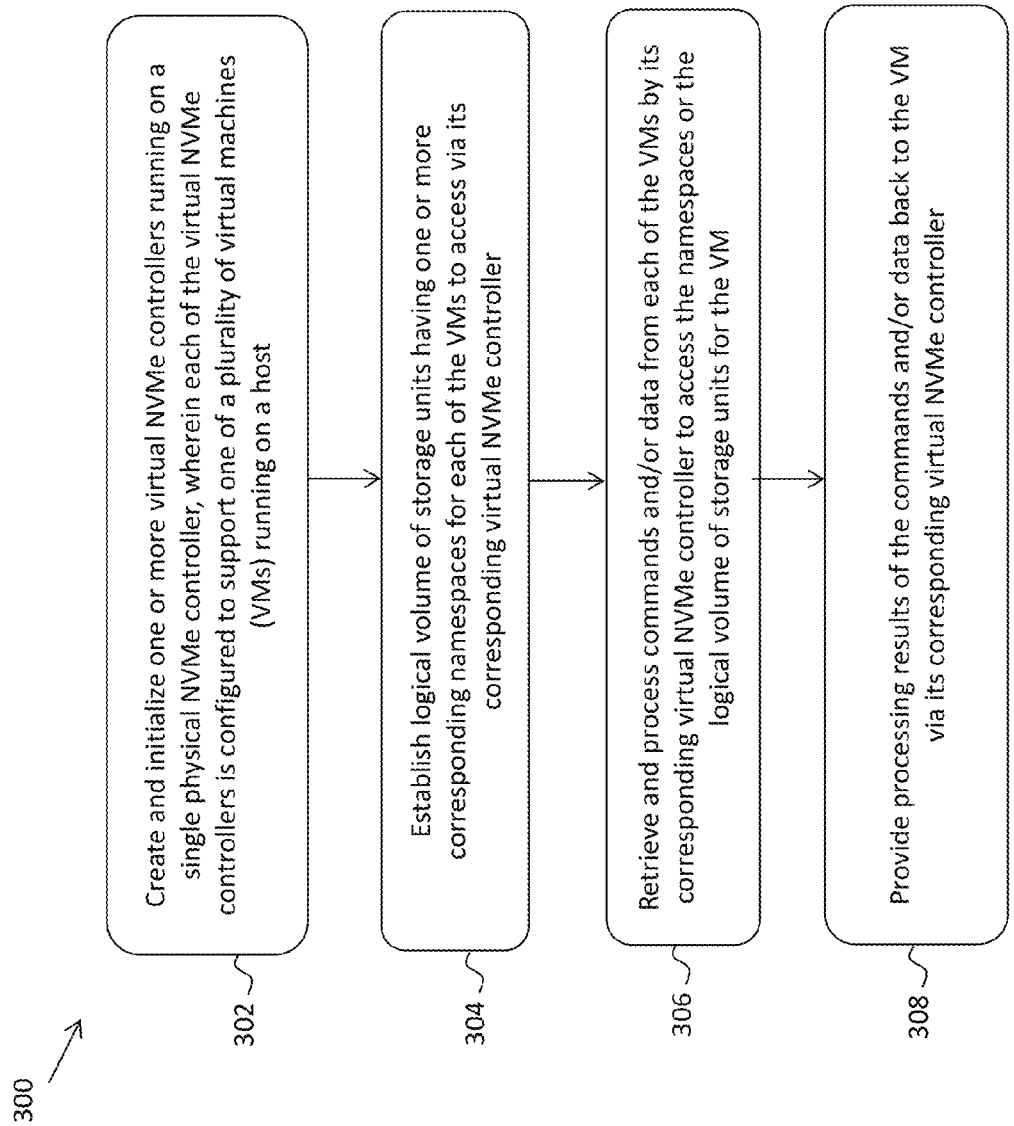
FIG. 3 depicts a flowchart of an example of a process to support NVMe controller virtualization in accordance with some embodiments.

FIG. 3 depicts a flowchart of an example of a process to support NVMe controller virtualization. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302, where one or more virtual NVMe controllers are created and initialized running on a single physical NVMe controller, wherein each of the virtual NVMe controllers is configured to support one or more of a plurality of virtual machines (VMs) running on a host in a one-to-one correspondence. The flowchart 300 continues to block 304, where a logical volume of storage units is established having one or more corresponding namespaces for each of the VMs to access via its corresponding virtual NVMe controller. The flowchart 300 continues to block 306, where commands and/or data from each of the VMs are retrieved and processed by its corresponding virtual NVMe controller to access the logical volume of storage units for the VM. The flowchart 300 ends at block 308, where processing results of the commands and/or data are provided back to the VM via its corresponding virtual NVMe controller.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system to support non-volatile memory express (NVMe) controller virtualization, comprising:
    an NVMe managing engine running on a host, which in operation, is configured to
        create and initialize one or more virtual NVMe controllers running on a single physical NVMe controller, wherein each of the virtual NVMe controllers is configured to support one of a plurality of virtual machines (VMs) running on the host to access its storage units;
        subsequently add or remove one or more of the virtual NVMe controllers based on the number of VMs running on the host and physical limitations of the physical NVMe controller to support the virtual NVMe controllers;
    said virtual NVMe controllers running on the single physical NVMe controller, wherein each of the virtual NVMe controllers is configured to:
        establish a logical volume of storage units having one or more corresponding namespaces for one of the VMs to access;
        retrieve and process commands and/or data from the VM to access the namespaces or the logical volume of storage units for the VM;
        provide processing results of the commands and/or data back to the VM via the virtual NVMe controller.

2. The system of claim 1, wherein:
the host of the VMs is an x86/ARM server.

3. The system of claim 1, wherein:
each of the virtual NVMe controllers is a hardware accelerated software engine emulating functionalities of an NVMe controller.

4. The system of claim 1, wherein:
each of the virtual NVMe controllers is configured to interact with and allow access from only one of the VMs.

5. The system of claim 1, wherein:
each of the storage units in the logical volume is attached to the physical NVMe controller locally.

6. The system of claim 1, wherein:
each of the namespaces is organized as a plurality of directories and files to enable the VM to access the logical volume via a filename or a path in the namespace on a storage device.

7. The system of claim 1, wherein:
multiple of the plurality of VMs are enabled to access the same logical volume and each logical volume is enabled to be shared among the multiple VMs through their respective virtual NVMe controllers.

8. The system of claim 1, wherein:
each of the virtual NVMe controllers is configured to support identity-based authentication and access from its corresponding VM for its operations, wherein each identity permits a different set of API calls for different types of commands used to create, initialize and manage the virtual NVMe controller and/or provide access to the storage units for the VM.

9. The system of claim 1, wherein:
the VMs running on the host are isolated from each other so that one VM cannot access the data storage and/or communication of any other VMs running on the same host.

10. The system of claim 1, wherein:
the NVMe managing engine is a physical function (PF) NVMe driver embedded in a hypervisor running on the host.

11. The system of claim 1, wherein:
the NVMe managing engine is configured to determine the number of the virtual NVMe controllers needed to support the VMs, load drivers to the physical NVMe controller used to communicate with the VMs, launch and monitor the virtual NVMe controllers dedicated to serve the VMs.

12. The system of claim 1, wherein:
the NVMe managing engine is configured to freeze the virtual NVMe controller assigned to the VM in time and to move the virtual NVMe controller to a different physical NVMe controller as part of the migration process for the VM, which is being migrated from the current host to another host.

13. The system of claim 1, wherein:
the physical NVMe controller connects to the host via a Peripheral Component Interconnect Express (PCIe)/NVMe link.

14. The system of claim 13, wherein:
each of the VMs running on the host has an NVMe driver configured to interact with the physical NVMe controller and the virtual NVMe controllers via the PCIe/NVMe connection.

15. The system of claim 1, wherein:
the physical NVMe controller provides both Physical Functions (PFs) and Virtual Functions (VFs) to support the virtual NVMe controllers running on it.

16. The system of claim 15, wherein:
each of the virtual NVMe controllers is configured to process the commands of its corresponding VM by invoking the supporting VF functions provided by the physical NVMe controller.

17. The system of claim 1, wherein:
the physical NVMe controller further includes:
an NVMe queue manager (NQM) configured to manage a plurality of queues that include the commands from the VM;
a processing engine that includes at least a memory unit and a processor configured to process the commands in the queues.

18. The system of claim 17, wherein:
the NQM fetches the commands from a first queue, provides the commands to the processing engine for processing, and puts the processing results of the commands in a second queue for the VM.

19. A computer-implemented method to support non-volatile memory express (NVMe) controller virtualization, comprising:
creating and initializing one or more virtual NVMe controllers running on a single physical NVMe controller, wherein each of the virtual NVMe controllers is configured to support one of a plurality of virtual machines (VMs) running on a host;
subsequently adding or removing one or more of the virtual NVMe controllers based on the number of VMs running on the host and physical limitations of the physical NVMe controller to support the virtual NVMe controllers;
establishing a logical volume of storage units having one or more corresponding namespaces for each of the VMs to access via its corresponding virtual NVMe controller;
retrieving and processing commands and/or data from each of the VMs by its corresponding virtual NVMe controller to access the namespaces or the logical volume of storage units for the VM;
providing processing results of the commands and/or data back to the VM via its corresponding virtual NVMe controller.

20. The method of claim 19, further comprising:
connecting the physical NVMe controller to the host via a Peripheral Component Interconnect Express (PCIe)/NVMe link.

21. The method of claim 19, further comprising:
fetching the commands from a first queue, providing the commands to a processing engine for processing, and putting the processing results of the commands in a second queue for the VM.

22. The method of claim 19, further comprising:
organizing each of the namespaces as a plurality of directories and files to enable the VM to access the logical volume via a filename or a path in the namespace on a storage device.

23. The method of claim 19, further comprising:
enabling multiple of the plurality of VMs to access the same logical volume and each logical volume to be shared among the multiple VMs through their respective virtual NVMe controllers.

24. The method of claim 19, further comprising:
supporting identity-based authentication and access by each of the virtual NVMe controllers from its corresponding VM for its operations, wherein each identity permits a different set of API calls for different types of commands used to create, initialize and manage the virtual NVMe controller and/or provide access to the storage units for the VM.

25. The method of claim 19, further comprising:
isolating the VMs running on the host from each other so that one VM cannot access the data storage and/or communication of any other VMs running on the same host.

26. The method of claim 19, further comprising:
determining the number of the virtual NVMe controllers needed to support the VMs, loading drivers to the physical NVMe controller used to communicate with the VMs, launching and monitoring the virtual NVMe controllers dedicated to serve the VMs.

27. The method of claim 19, further comprising:
freezing the virtual NVMe controller assigned to the VM in time and moving the virtual NVMe controller to a different physical NVMe controller as part of the migration process for the VM, which is being migrated from the current host to another host.

28. The method of claim 19, further comprising:
providing both Physical Functions (PFs) and Virtual Functions (VFs) to support the virtual NVMe controllers running on the physical NVMe controller.

29. The method of claim 28, further comprising:
processing the commands of its corresponding VM by invoking the supporting PF and/or VF functions provided by the physical NVMe controller.

\* \* \* \* \*